United States Patent [19]

Hubeny

[11] 4,075,749
[45] Feb. 28, 1978

[54] TOOL FOR CLOSING A WALL OPENING

[76] Inventor: Jerry Hubeny, 2229 S. Elmwood Ave., Berwyn, Ill. 60402

[21] Appl. No.: 640,955

[22] Filed: Dec. 15, 1975

[51] Int. Cl.$^2$ ............................................. B23P 19/04
[52] U.S. Cl. ...................................... 29/268; 81/426; 81/5.1 R; 7/1 Q
[58] Field of Search .................. 81/5.1 R, 418, 425 B, 81/426, 419, 420, 424, 426, 421–423, 125; 29/248, 268, 238, 239, 200 H; 145/46; 7/1 Q, 3 R, 4; 339/128; 220/307

[56] References Cited

U.S. PATENT DOCUMENTS

| | | | |
|---|---|---|---|
| 483,695 | 10/1892 | Ray | 7/1 Q |
| 1,334,965 | 3/1920 | Ridings | 81/423 |
| 1,427,550 | 8/1922 | Ridings | 81/423 |
| 1,492,908 | 5/1924 | Trumbo | 7/1 Q |
| 1,753,631 | 4/1930 | Walters | 220/307 |
| 1,929,163 | 10/1933 | Diskin et al. | 81/5.1 R |
| 2,111,106 | 3/1938 | Tinnerman | 29/268 |
| 2,154,580 | 4/1939 | Perrin et al. | 29/268 |
| 2,445,761 | 7/1948 | Castle | 7/1 Q |
| 3,111,750 | 11/1963 | Moore et al. | 81/418 |

*Primary Examiner*—James L. Jones, Jr.
*Assistant Examiner*—Roscoe V. Parker

[57] ABSTRACT

A tool of the nature of a pair of pliers which has on one jaw a magnet for holding a plug to be inserted into an opening in an electrical box and which has on the other jaw a backing member so that when the tool is operated the plug is pressed into the opening from one side of a wall of the box against pressure applied by the backing member on the other side of the wall.

1 Claim, 6 Drawing Figures

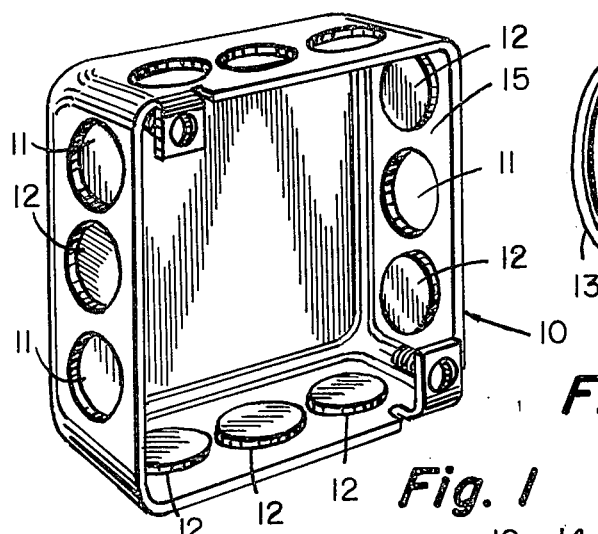
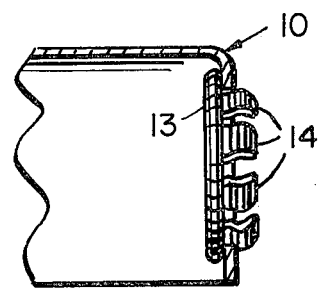
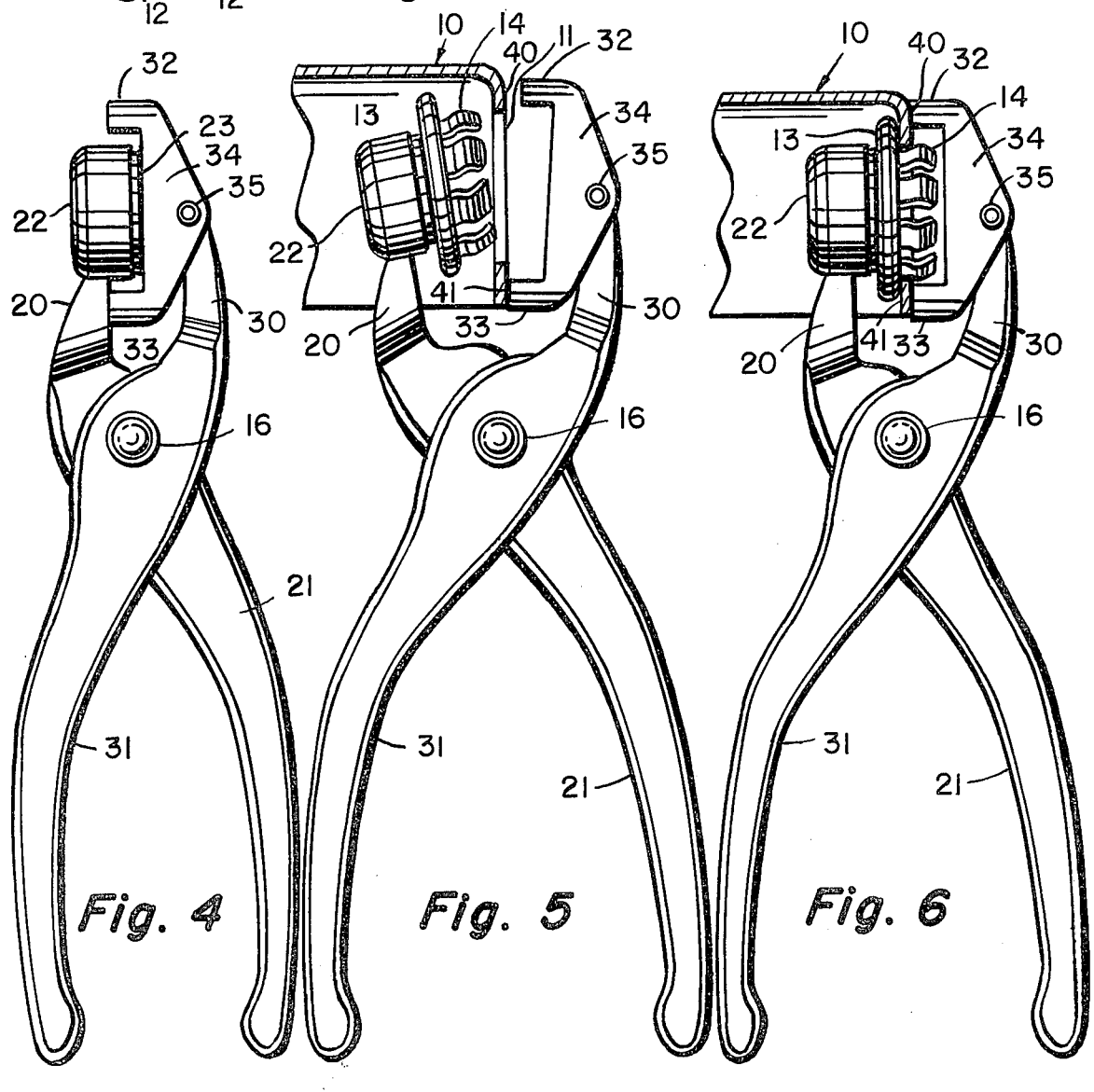

TOOL FOR CLOSING A WALL OPENING

This invention relates to a tool for closing an opening in a wall and, particularly in a wall of a box used in electrical wiring installations.

BACKGROUND

In electrical wiring installations in building structures it is common to provide metal boxes for enclosing the wiring connections. These boxes commonly are square, rectangular or octagonal in shape, but may be of any configuration. These boxes contain knock-out discs in their walls. The discs are usually circular and are partially cut about so that when an opening into the box for the entry of wire ends is desired, the disc can be esily knocked out with a hammer or other such tool to provide the necessary opening in the wall of the box.

During the installation or reworking of electrical conduit some holes in the boxes may be found to be open or discs may have been accidently knocked out. It is a requirement of most electrical codes that the wiring in boxes must be completely enclosed so that there is no exposure if any shorts or sparks should occur within the box.

Metal plugs are made for closing the openings in the walls of the boxes, and the usual method of installing these plugs is to place the plug over the opening with the fingers of one hand and use a hammer with the other hand to drive the plug into the opening; but this can hardly be done in tight places and it is easy for the electrician to hit his finger instead of the plug.

Accordingly, I have sought a better way to insert the plugs into the knock-out holes and a tool which can conveniently be used for this purpose.

According to my invention, I provide such a tool and in the accompanying drawings and description I illustrate the tool and describe the method in which it is used.

In the drawings,

FIG. 1 is a perspective view of a common electrical box;

FIG. 2 is a perspective view of a plug of a type commonly supplied for closing knock-out openings in the box;

FIG. 3 is a broken detail view partly in section showing the plug in place to close a knock-out opening in the box;

FIG. 4 is a front view of one embodiment of the improved tool;

FIG. 5 is a view like FIG. 4 but showing the jaws opened with the jaws about a wall of the box in position to insert the plug; and FIG. 6 is a view like FIG. 5 except for showing the tool and the plug after the plug has been pressed into place in the box opening.

As illustrated, the electrical box of FIG. 1 shows the well known box 10 having walls 15 containing knock-out openings 11 some of which are closed by knock-out discs 12, and others from which the knock-out discs have been removed to leave simply the circular opening in the wall of the box.

The plug P illustrated in FIG. 2 is metallic and includes a flat disc 13 of a size to cover the openings in the box, and the spring fingers 14 which are arranged annularly about the disc in a circle correspond to the size of the opening in the box. Each of fingers 14 are curved and, as shown more clearly in FIG. 3, are resiliently pressed inwardly as the plug is inserted and snap out again when the disc 13 comes into place against the inside of the wall.

Referring to FIG. 4, the improved tool is in the form of a pair of pliers having jaws 20 and 30 which are pivotally attached by the pin 16. A handle member 21 is an extension of the jaw 20 and a handle member 31 is an extension of the jaw 30. The handles 21 and 31 and the pivoted arrangement of the jaws provide means for moving the jaws apart and toward each other in the use of the tool.

One of the jaws, and in the illustrated embodiment it is jaw 20, has at its end a permanent magnet 22. The magnet may be attached to the jaw by welding or other suitable means of attachment. This magnet may be cylindrical or in any other form and has a flat face 23 against which the flat plate of the plug P may be placed.

The other jaw 30 has a backing member 32 which, when the plug on magnet 22 is aligned with the opening, is positioned so as to be aligned with an area 40 of the wall of the box which is to one side of the opening (See FIG. 5). This backing member may be simply an extension of the jaw 30. However, I prefer, as illustrated, to provide a second backing member 33 which is positioned so as to be aligned with an area 41 of the wall of the box which is on the side of the opening which is diametrically opposed to area 40. Also, while my tool will operate effectively when the backing members are fixedly secured on the jaw, I prefer that they be a part of a piece 34 which is pivotally attached to the jaw as by the pin 35. Piece 34 may take the form of a front plate and a back plate. The end of jaw 30 extends between these plates and is pivotally connected by the pin 35 which extends through the end of the jaw and through both such front and back plates.

In my improved method for inserting a plug into the opening in an electrical box, the operator takes the tool in one hand and with the jaws in an open condition takes a plug in his other hand and places it with its flat plate on the face of the magnet. The magnet effectively holds the plug in this position. Then he moves the tool about a section of the wall of the box so that the plug is aligned with opening 11 in the wall (the position shown in FIG. 5) and squeezes the handles 21, 31, to bring jaws 20, 30 toward each other. This causes the jaw 20 to press the fingers 14 of the plug through the wall opening as the backing member 32 and 33 engage the areas 40 and 41 respectively on the other side of the wall. When the piece 34 which includes the backing members is pivotally mounted, any slight misalignment is compensated for by movement of the piece about its pivot.

When the plug has been inserted and the flat plate of the plug comes against the wall of the box (as shown in FIG. 6) the operator may relax his grip on handles 21, 31 to open the jaws 20, 30 and remove the tool to leave the wall opening effectively closed.

Although the improved tool may be used to insert the plugs from either the inside or the outside of the box, I prefer to insert the plugs from the inside so that the plug fingers will not extend inside the box where they might be a hazard and might possibly scratch or cut the wires inside the box.

It is an advantage that after the plug has been placed on the magnet the operator may insert the plug with one hand only. Further, with this tool the operator may insert plugs in openings in tight places which could not be reached by hand or where a hammer could not be used.

While I have illustrated and described in detail certain embodiments of the invention, it will be apparent to those skilled in this art that many embodiments may be constructed and many changes made all within the spirit of the invention and the scope of the appended claims.

I claim:

1. A tool for closing an opening in a wall comprising a pair of pliers pivotally connected at their central portions, said pliers providing handles at the rearward portions and providing at their forward portions a pair of jaws, a magnet at the forward end of one of said jaws, said magnet being cylindrical and having its longitudinal axis transverse with the longitudinal axis of said one jaw and having a flat circular magnetized surface facing the other of said jaws, a metallic plug having a circular flat metallic disc which is adjacent said magnetized surface and held thereon by the force of said magnet, the other of said jaws having a backing piece having a pair of backing members aligned with areas of said wall on opposite sides of said opening, said backing piece being pivotally attached at its center with said other jaw, whereby when said jaws are on opposite sides of said wall and said plug is aligned with said opening and said handles are moved toward each other, said plug is moved into said opening.

* * * * *